(12) United States Patent
Nakamoto

(10) Patent No.: US 6,414,937 B1
(45) Date of Patent: Jul. 2, 2002

(54) SELF-HEALING METHOD OF ABR AND ATM CELL SWITCH DEVICE THEREFOR

(75) Inventor: Masashi Nakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/145,542

(22) Filed: Sep. 1, 1998

(30) Foreign Application Priority Data

Sep. 3, 1997 (JP) .............................. 9-238338

(51) Int. Cl.$^7$ .............................. H04J 3/14; H04J 1/16; H04L 1/00; H04L 12/26; G01R 31/08; G06F 11/00
(52) U.S. Cl. ..................................... 370/225; 370/236.1
(58) Field of Search ................................ 370/216–221, 370/225, 228–229, 235–236, 395, 395.1, 235.1, 236.1, 236.2; 714/712

(56) References Cited

U.S. PATENT DOCUMENTS 5,959,972 A * 9/1999 Hamami ..................... 370/228

FOREIGN PATENT DOCUMENTS

| JP | 8-279812 | 10/1996 |
| JP | 8-340335 | 12/1996 |
| JP | 9-55751 | 2/1997 |
| JP | 9-135244 | 5/1997 |
| JP | 9-247170 | 9/1997 |
| JP | 10-56460 | 2/1998 |

OTHER PUBLICATIONS

M. Nakamoto et al., "Examining the ABR self–healing Method", p. 403, Electronic Information Communications Society General Conference, Communications Second Edition, B–8–17, Mar. 24–27, 1997.

K. Nishimura et al., "Evaluation of ABR in ATM Acess Networks", pp. 19–24, The Institute of Electronics, Information and Communication Engineers, vol. 97, No. 210, SSE97–55, Jul. 25, 1997.

R. Kawahara et al., "A Simple and Efficient ABR Control Algorithm under PCR/MCR Constraints", pp. 25–30, The Institute of Electronics, Information and Communication Engineers, vol. 97, No. 210, SSE97–56, Jul. 25, 1997.

K. Nakamichi et al., "A Study of ABR Rate Control", pp. 19–24, The Institute of Electronics, Information and Communication Engineers, vol. 97, No. 210, Aug. 28, 1997.

Proceedings of the 1996 Communication Society Conference of IEICE, four pages, B–835, p. 320; B–708, p. 193; and B–739, p. 224.

\* cited by examiner

*Primary Examiner*—Kwang Bin Yao
*Assistant Examiner*—Kevin C. Harper
(74) *Attorney, Agent, or Firm*—Young & Thompson

(57) ABSTRACT

A cell is transferred from a source terminal to a destination terminal at a variable rate and, when a failure occurs in a path in which the cell transfer is performed, the cell transfer is maintained by assuring a frequency band in a bypass route different from the path in which the failure occurs and switching the failure path to the bypass route. In this operation, upper limits of the cell sending rates of the respective source terminals on the failure path and the bypass route are fixed during a time period from a time when the frequency band is assured on the bypass route to a time when the switching of path is completed. Since the increase of the source terminal sending rate is restricted on both the original route and the bypass route during the time period from the time when the frequency band is assured on the bypass route to the time when the switching of path is completed, the self healing of ABR becomes possible without loss of cell.

14 Claims, 10 Drawing Sheets

SELF-HEALING METHOD OF ABR AND ATM CELL SWITCH DEVICE THEREFOR

BACKGROUND OF THE INVENTION

The present invention claims priority from Japanese Patent Application No.9-238338 filed Sep. 3, 1997, which is incorporated herein by reference.

1. Field of the Invention

The present invention relates to a self-healing for improving the reliability of ABR (Available Bit Rate) communication services in an ATM (Asynchronous Transfer Mode) transmission.

2. Description of Related Art

As a technique for improving the reliability of communication services in an ATM transmission, the self healing process for automatically setting a new communication route by preparing a bypass of an original communication route in which a failure occurs has been known. A conventional ATM cell switch device which can perform such processing is shown in FIG. 1.

FIG. 1 is a block diagram showing a construction of the conventional ATM cell switch device 11 together with two ATM terminals, in which one of the ATM terminals transmits data cell as a source terminal 21 and the other ATM terminal receives the data cell as a destination terminal 22. Only portions of the ATM cell switch device 11 which are related to the data cell transfer from the source terminal 21 to the destination terminal 22 are shown in FIG. 1.

The ATM cell switch device 11 includes a receiver circuit 13a which receives a cell including data cell and RM (Resource Management) cell for network control in relation to the data cell, a source terminal transmission rate measuring circuit 14 and a switch (SW) circuit 15 which receives the cell transmitted from the receiving circuit 13a through the source terminal transmission rate measuring circuit 14. In the SW circuit 15, a routing is performed on the basis of a VPI and VCI of a cell header of the cell and the cell is transmitted to the destination terminal 22 through a transmitter circuit 16a which is also included in the ATM cell switch device 11. The RM cell aliased by the destination terminal 22 is transmitted to the source terminal 21 through a receiving circuit 16b, the SW circuit 15 and a transmitter circuit 13b.

The source terminal transmission rate measuring circuit 14 counts the ATM cells on the receiving side and outputs the count to a control circuit 12 as a measured source terminal transmission rate signal. The measured source terminal transmission rate signal is used during a time period in which self healing is being executed as a source terminal transmission rate of a path to be monitored when the path to be monitored is a failure path and as an amount of use of frequency band of a bypass route when the path to be monitored is on a bypass route.

The control circuit 12 compares "source terminal transmission rate of an original route" with "amount of idle frequency band" calculated on the basis of the amount of use of frequency band in the bypass route to determine whether or not the original path can assure a frequency band therefor on the bypass route. When it is possible to assure the frequency band on the bypass route, the control circuit 12 outputs a self healing switch instruction signal to the SW circuit 15 to switch the original path to a path on the bypass route.

FIG. 2 is an illustration for explaining an example of frequency band assuring. When the amount of idle frequency band of the bypass route, that is, a value of the physical circuit capacity subtracted by the amount of use of frequency band of the bypass route, exceeds the source terminal transmission rate of the original route, it can be determined that the frequency band assuring is possible.

A problem in this case is that, in order to perform the self healing process, it is generally necessary to perform frequency band calculations of the original and the bypass routes and to rewrite a routing table and, therefore, there is a difference produced in time between a time when a frequency band is assured in the bypass route and a time when the switching of the original path to the bypass route is completed. Particularly, in the case of the ABR communication services, the source terminal transmits data at a rate corresponding to the state of network without preliminarily reserving a frequency band therefor. Therefore, when the self healing is to be performed, there is. a possibility that the transmission rate of the source terminal of the original path (failure path) or the transmission rate of the source terminal of the bypass path at the completion of the switching is increased compared with that at the band assuring time of the bypass route, that is, the start time of the self healing execution. FIGS. 3 and 4 show examples of such case.

FIGS. 3 and 4 show cases where the source terminal transmission rates of the original route and the bypass route are increased at the completion of the switching to the bypass route compared with those at the band assuring time of the bypass route, respectively. As shown in FIG. 3, when the source terminal transmission rate of the original route at the switching time is increased compared with that at the band assuring time, a frequency band for the increment of the rate can not be assured necessarily. Therefore, a portion of cell, which corresponds to the increment of transmission rate, exceeds the physical circuit capacity of the bypass route and loss of the cell portion may occur. Further, as shown in FIG. 4, when the source terminal transmission rate of the bypass route at the time of switching is increased compared with that at the band assuring time, a sum of a frequency band therefor and an assured frequency band for the source terminal transmission rate to be switched from the original route may exceed the physical circuit capacity. Therefore, there is a possibility of loss of cell on the bypass route immediately after the switching thereto by the self healing even in such case.

SUMMARY OF THE INVENTION

An object of the present invention is to provide a self healing method for continuing a cell transfer between a source terminal and a destination terminal when a failure occurs in an original path by assuring a frequency band on a bypass route and switching the original path to the bypass route without loss of cell and an ATM cell switch device for use in the same method.

According to a first aspect of the present invention, a self healing method for use in the ABR communication service in which, when a failure occurs in a path in which a cell transfer from a source terminal to a destination terminal is being performed at a variable rate, the cell transfer is maintained by assuring a frequency band in a bypass route different from the path in which the failure occurs and switching the path to the route, is featured by comprising the step of fixing upper limits of the cell sending rate at respective source terminals in both the path in which the failure occurs and the bypass route, during a time period from a time when a frequency band is assured in the bypass route to a time of completion of path switching.

In order to fix the upper limit of cell sending rate, an ATM cell switch device which performs the path switching and an ATM cell switch device on the bypass route set contents of ER (Explicit Rate) fields of BRM (Backward Resource Management) cells (referred to as "ER-in-BRM fields", hereinafter) to be transferred to the respective source terminals to a value of the sending rate of one of the source terminals which is used at the time when the frequency band is assured in the bypass route during the time period from a time when the frequency band is assured in the bypass route to a time of completion of path switching. The respective source terminals set sending rates thereof according to the contents of the ER-in-BRM fields. Further, contents of ER fields of FRM (Forward Resource Management) cells (referred to as "ER-in-FRM cells", hereinafter) to be transferred to the respective destination terminals are preferably set to the same value. The FRM cell is aliased by the destination terminal as a BRM cell. Since there is a possibility of loss of cell due to the failure on the original route, it is preferable to produce and send FRM cell and BRM cell by the ATM cell switch devices in addition to those transferred from the source terminals and the destination terminals.

Separately from the above mentioned matters or in combination with them, it is possible to set a NI (No Increase) bit of the BRM cell (referred to as "NI-in-BRM bit", hereinafter) to a predetermined value in the ATM cell switch device and to prevent the cell sending rate from being increased on the side of the source terminal which receives such BRM cell. In such case, it is preferable to set a NI bit in FRM cell (referred to as "NI-in-FRM bit", hereinafter) similarly.

Further, it is possible, in order to fix the upper limit of the cell sending rate, to utilize an EFCI (Explicit Forward Congestion Indication) bit of a data cell (referred to as "EFCI-in-Data bit", hereinafter). That is, the ATM cell switch devices set the EFCI-in-Data bit to a predetermined value and transfer it to corresponding destination terminal and the respective destination terminals send BRM cells having NI bit and/or EFCI bit set to predetermined value to corresponding source terminals. According to the BRM cell, the source terminal prevent the cell sending rate thereof from being increased by its self According to a second aspect of the present invention, an ATM cell switch device is featured by comprising receiving means for receiving a cell from a source terminal to which the cell is input through a transmission link, switch means for routing the received cell on the basis of the VPI and the VCI of the received cell, transmission means for sending the cell toward a destination terminal, control means for managing a sending rate of the source terminal, instructing a path switching to said switch means during an execution of self healing and judging whether or not a frequency band is assured in a bypass route and means for preventing an increase of source terminal sending rate by sending a control information for preventing the sending rate of the source terminal from being increased during a time period from a time when the control means judges the frequency band assuring in the bypass route to a time when the path switching is completed by the switch means.

The preventing means may comprise a source terminal sending rate measuring circuit for counting cells received from said source terminal, a buffer circuit for holding a source terminal sending rate, that is, cell count rate, ($CCR_{SH}$) at a time when the frequency band of the bypass route is assured and an ER field change circuit for changing the ER-in-BRM field transferred from the destination terminal to the source terminal for circuit control to the $CCR_{SH}$. In such case, it is preferable to provide an ER field change circuit for changing the content of the ER in-FRM field transferred from the source terminal side to the destination terminal side to the $CCR_{SH}$. Further, the preventing means preferably comprises a BRM cell producing/insertion circuit for newly producing a BRM cell having the ER field set to the $CCR_{SH}$ and sending it toward the source terminal and an FRM cell producing/insertion circuit for producing an FRM cell similarly and sending it toward the destination terminal.

Separately from this or in combination therewith, the preventing means preferably comprises a NI-in-BRM bit change circuit for changing a NI bit of BRM cell transferred from the side of the destination terminal toward the side of the source terminal to "1". In this case, too, the preventing means preferably further comprises a NI-in-FRM bit change circuit for changing a NI bit of an FRM cell transferred from the side of the source terminal toward the side of the destination terminal to "1", a BRM cell producing/insertion circuit for newly producing a BRM cell having NI bit set with "1" and sending it toward the source terminal and an FRM cell producing/insertion circuit for producing an FRM cell similarly and sending it toward the destination terminal.

Further, the preventing means may comprise an EFCI-in-Data bit change circuit for changing the EFCI bit of the data cell transmitted from the source terminal to the destination terminal to "1".

As described, the preventing circuit sends a control information for preventing the sending rate from being increased to the source terminal directly or through the destination terminal indirectly during the time period in execution of the self healing from the time when the frequency band of the bypass route is assured to the time when the switching of route is completed. Thus, it is possible to prevent the source terminal sending rates of the original route and the bypass route from being increased and hence to execute the self healing of the ABR without loss of cell.

DETAILED DESCRIPTION OF THE PREFERRED EMBODIMENTS

Figure 1:
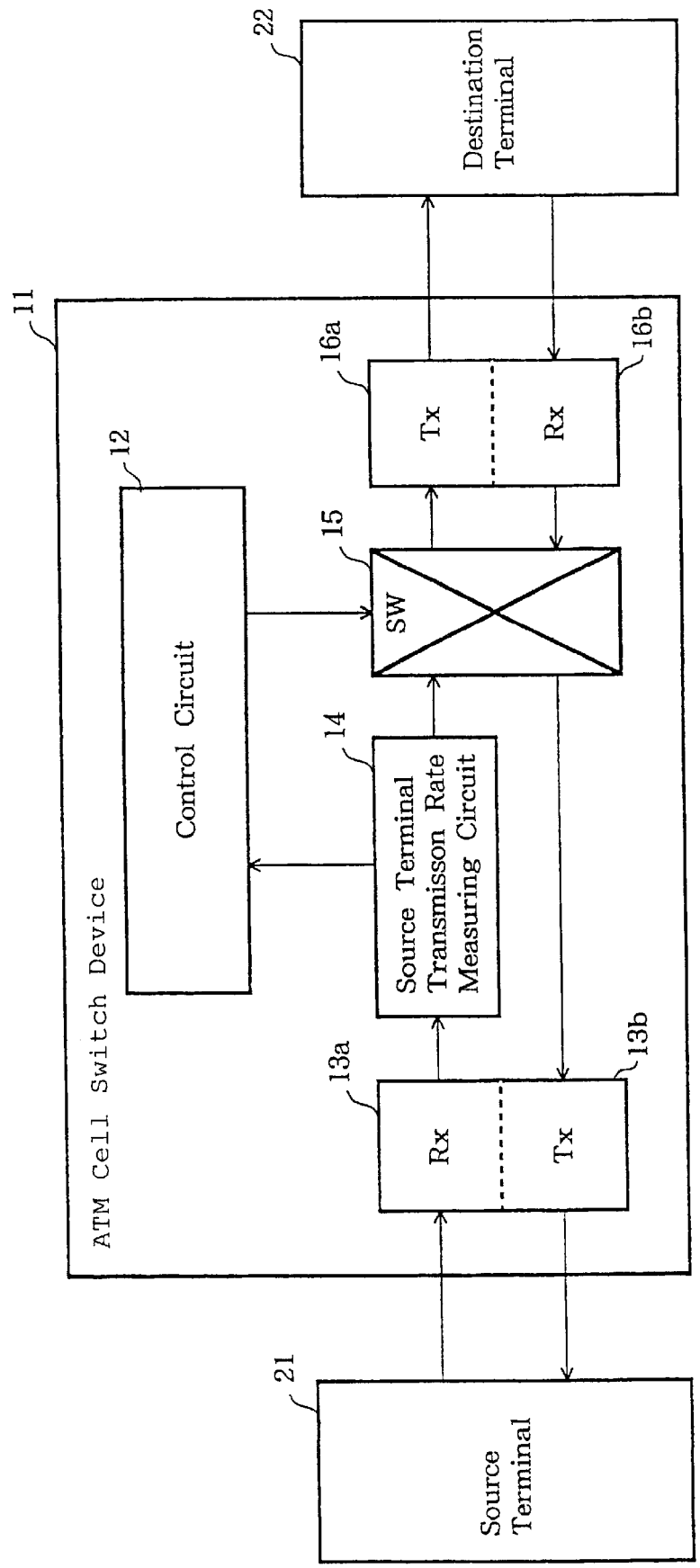
FIG. 1 is a block diagram showing a conventional ATM cell switch device with two ATM terminals.
Figure 2:
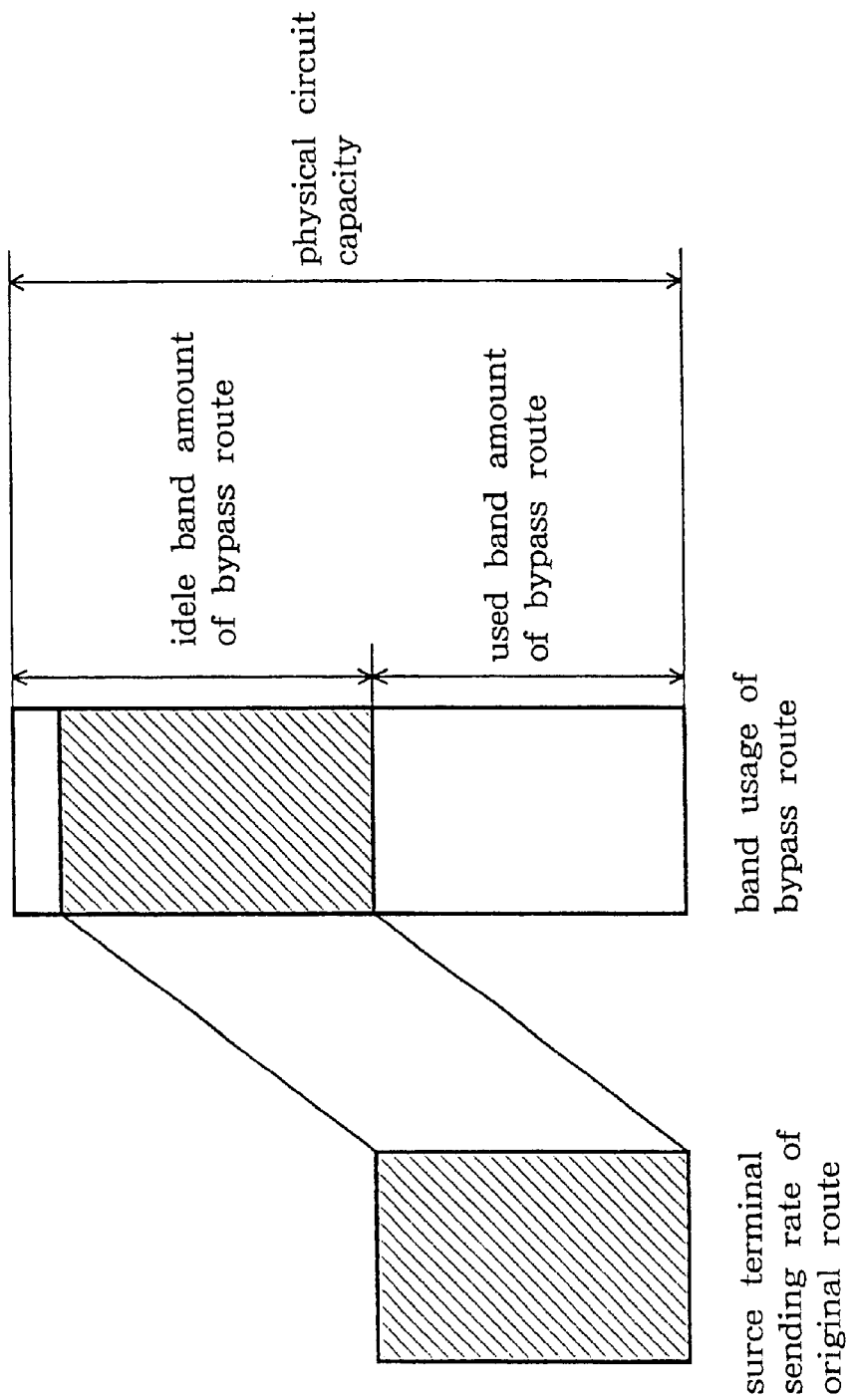
FIG. 2 is an illustration for explaining an example of a holding of frequency band.
Figure 3:
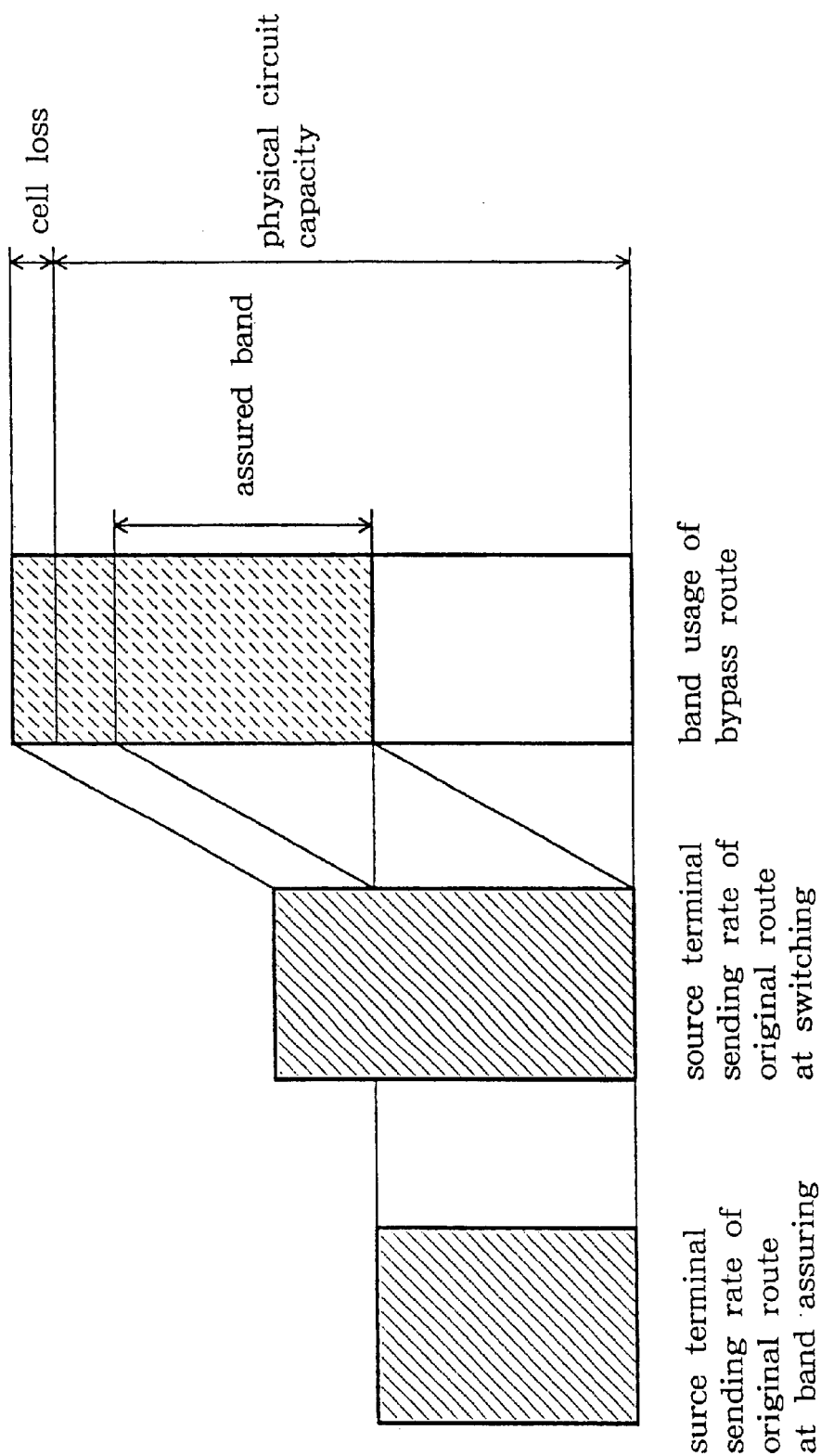
FIG. 3 shows an example in which a source terminal transmission rate in a path at a time when a switching thereto is completed is increased compared with that at a time when a frequency band of the bypass is held.
Figure 4:
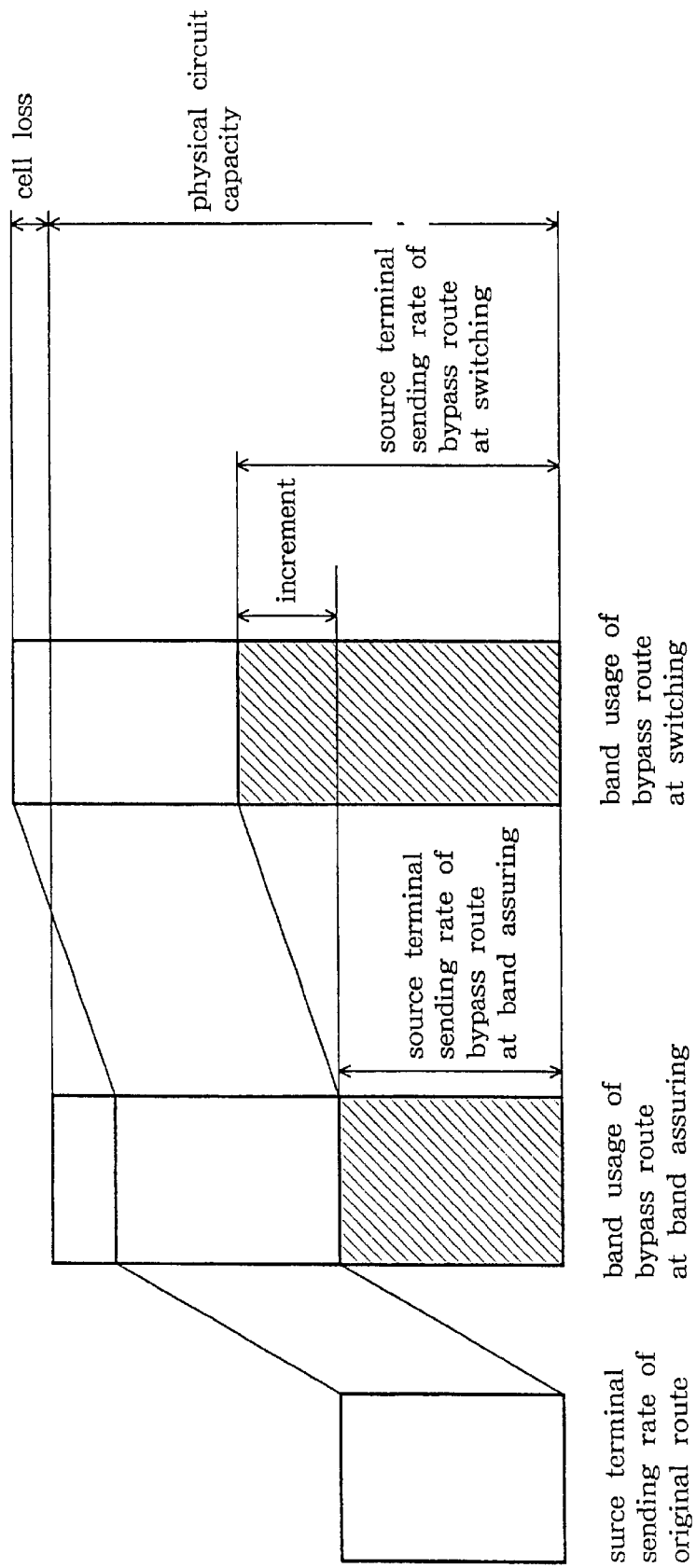
FIG. 4 shows an example in which a source terminal sending rate in a bypass at a time when a switching thereto is completed is increased compared with that at a time when a frequency band of the bypass is held.
Figure 5:
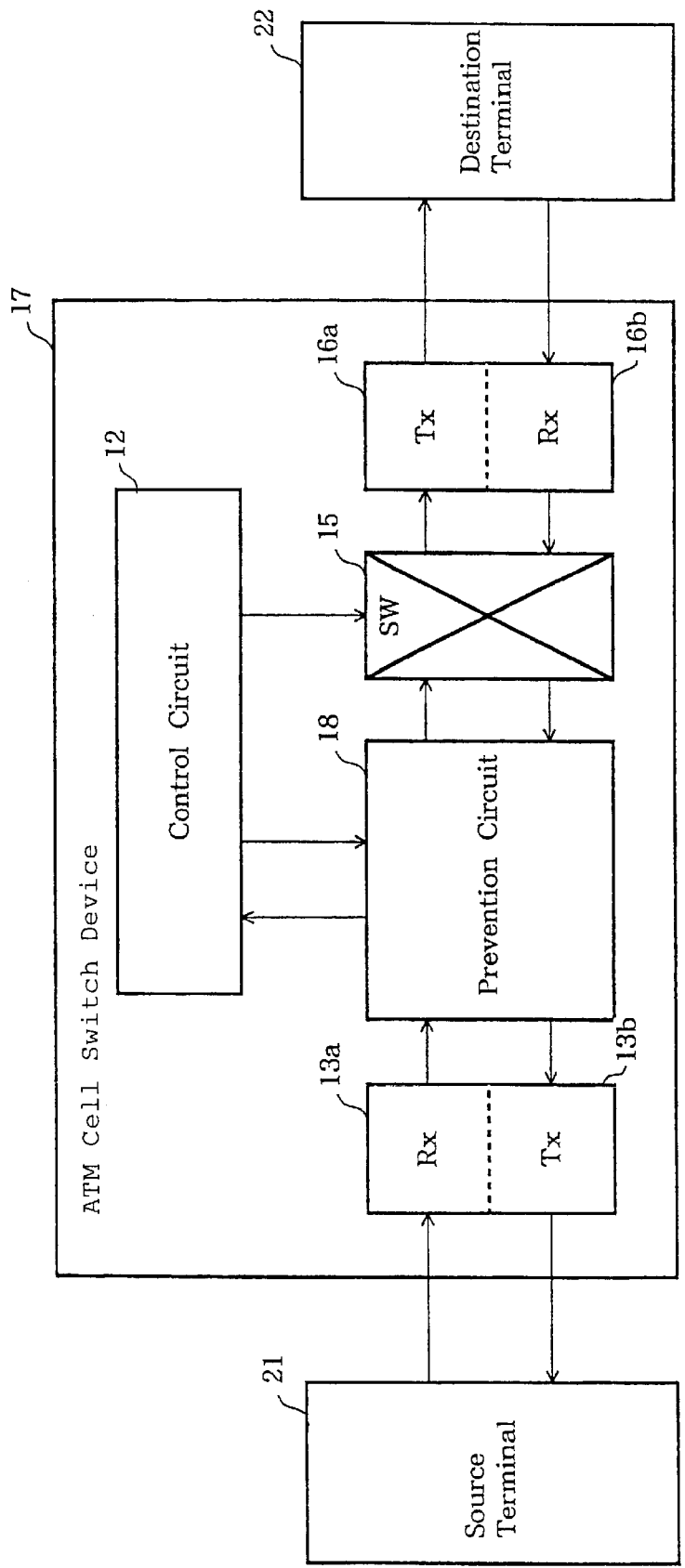
FIG. 5 is a block diagram showing an embodiment of the present invention.

FIG. 5 is a block diagram of an embodiment of the present invention and shows an ATM cell switch device 17 and two ATM terminals, that is, a source terminal 21 and a destination terminal 22. The ATM cell switch device 17 is shown as including only portions related to a transfer of data cell from the source terminal 21 to the destination terminal 22 and other portions are omitted.

The ATM cell switch device 17 includes a receiver circuit 13a for receiving, from the source terminal 21, a cell input through a transmission link, a switching (SW) circuit 15 for routing a cell on the basis of VPI and VCI of the received cell, a transmitter circuit 16a for supplying the cell toward the destination terminal 22, a control circuit 12 for managing a transmission rate of the source terminal 21, instructing a path switching to the SW circuit 15 at a time when the self healing is executed and judging a frequency band assuring in a bypass and a prevention circuit 18 for preventing the source terminal sending rate from being increased by sending, to the SW circuit 15, a control information for preventing the source terminal sending rate from being increased during a time period from a time when the control circuit 12 judges the band assuring in the bypass to a time when the switching of path is completed by the SW circuit 15. Further, the ATM cell switching device 17 shown in FIG. 5 includes a receiver circuit 16b and a transmitter circuit 13b for transferring a BRM cell from the side of the destination terminal 22 to the source terminal 21.

The prevention circuit 18 has a function of continuously changing a content of the FRM cell, the BRM cell or the data cell on the original path (failure path) and the bypass path during a time period from the time of assuring the frequency band for bypass route to the switching completion time when the self healing is executed, in order to prevent the source terminal sending rate from being increased. Since there is a high possibility that the FRM cell, the BRM cell and the data cell on the original path are abandoned or lost due to failure, it is preferable that the prevention circuit 18 further has a function of producing and inserting the FRM cell and the BRM cell.

Figure 6:
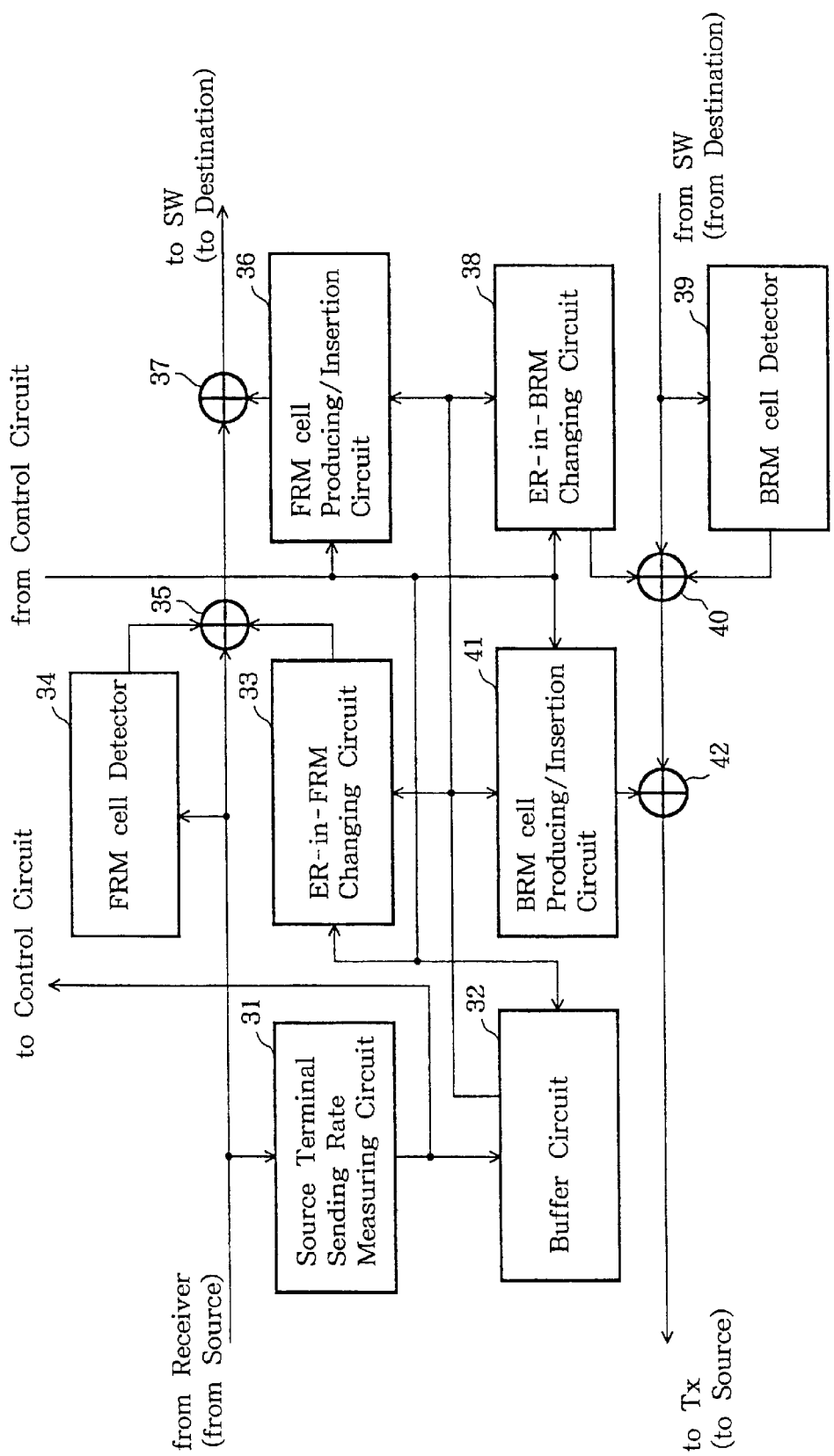
FIG. 6 is a block diagram showing a construction of a prevention circuit of the embodiment shown in FIG. 5, for preventing the source terminal sending rate from being increased.

FIG. 6 is a block diagram showing an example of construction of the prevention circuit 18. In this construction, the increase of sending rate in the source terminal is prevented by utilizing the ER-in-RM field.

In FIG. 6, a source terminal sending rate measuring circuit 31 counts cells received by the receiver circuit 13a (FIG. 5) and outputs a signal of a result of count to the control circuit 12 (FIG. 5) and a buffer circuit 32. The buffer circuit 32 holds the source terminal sending rate at the time of the frequency band assurance, that is, the start time of self healing, when it receives a self healing execution start signal from the control circuit 12. This sending rate will be represented by cell count rate $CCR_{SH}$. An ER-in-FRM field change circuit 33 is responsive to the self healing execution start signal from the control circuit 12 to read a value of cell count rate $CCR_{SH}$ and outputs the value to an insertion circuit 35 as the ER-in-FRM field change signal. An FRM cell detector 34 determines whether or not the cell received by the receiver circuit 13a is a FRM cell and, when the cell is the FRM cell, outputs an FRM cell detection signal to the insertion circuit 35. The insertion circuit 35 changes the ER-in-FRM field in cells received by the receiver circuit 13a to the $CCR_{SH}$ value and transfers the latter to the SW circuit 15 (FIG. 5). An FRM cell producing/insertion circuit 36 is responsive to the self healing execution start signal from the control circuit 12 to produce a new FRM cell set in its ER field with the $CCR_{SH}$ value read out from the buffer circuit 32 and outputs the new FRM cell to an insertion circuit 37. The insertion circuit 37 transfers this FRM cell to the SW circuit 15.

The FRM cell having the content changed by the ER-in-FRM field change circuit 33 and the insertion circuit 35 and the newly inserted FRM cell by the FRM cell producing/insertion circuit 36 and the inserting circuit 37 are aliased in the destination terminal 22, resulting in a BRM cell.

An ER-in-BRM field change circuit 38 is responsive to the self healing execution start signal from the control circuit 12 to read out the $CCR_{SH}$ value from the buffer circuit 32 and outputs the value to an insertion circuit 40 as an ER-in BRM field change signal. A BRM cell detector 39 judges whether or not the cell received by the receiver circuit 16b (FIG. 5) is a BRM cell and, when the cell is the BRM cell, outputs a BRM cell detection signal to an insertion circuit 40. The insertion circuit 40 changes the ER field for the BRAM cell in the cells received by the receiver circuit 16b into the $CCR_{SH}$ value and transfers the latter to the transmitter circuit 13b (FIG. 5). A BRM cell producing/insertion circuit 41 is responsive to the self healing execution start signal from the control circuit 12 to produce a new BRM cell having the ER field set to the $CCR_{SH}$ value read out from the buffer circuit 32 and outputs it to an insertion circuit 42. The insertion circuit 42 transfers this BRM cell to the transmitter circuit 13b.

The operations of the buffer circuit 32, the ER-in-FRAM change circuit 33, the FRM cell producing/insertion circuit 36, the ER-in-BRAM field change circuit 38 and the BRM cell producing/insertion circuit 41 continue until the self healing start signal is canceled, that is, the switching due to the self healing is completed.

Through these processing, the ER field of the BRM noticed to the source terminal is fixed to the $CCR_{SH}$ value and the source terminal can not transmit cells at a rate exceeding he $CCR_{SH}$. Therefore, there is no case where the source terminal sending rate is increased from the value at the band assuring time.

Figure 7:
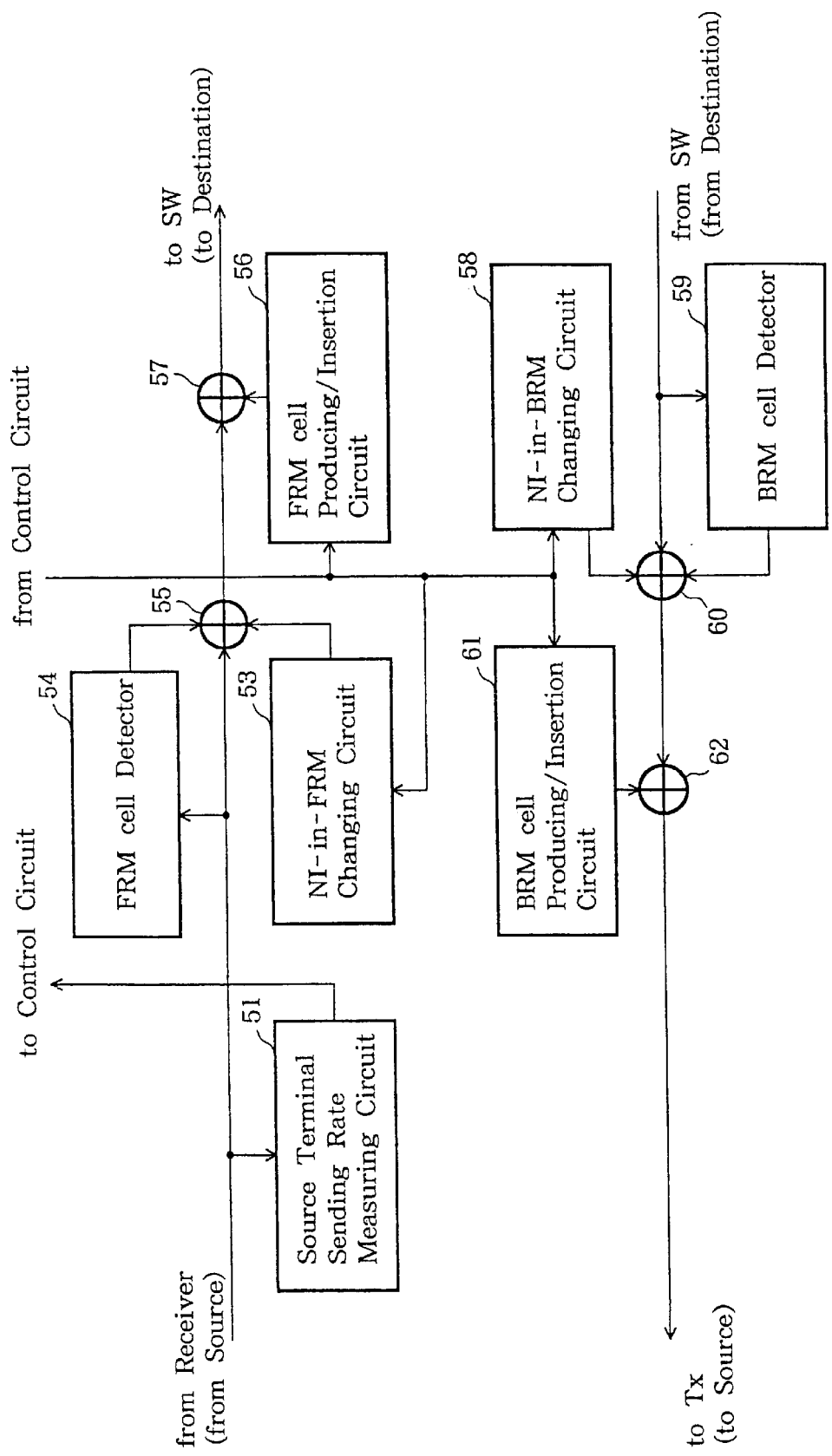
FIG. 7 is a block diagram showing another construction of a prevention circuit of the embodiment shown in FIG. 5, for preventing the source terminal sending rate from being increased.

FIG. 7 is a block diagram showing another example of the construction of the prevention circuit 18 according to which the source terminal sending rate is prevented from being increased by utilizing NI bit of the RM cell.

A source terminal sending rate measuring circuit 51 counts cells received by a receiver circuit 13a and output a result of count to a control circuit 12 as a measured source terminal sending rate signal. An NI-in-FRM bit change circuit 53 is responsive to the self healing execution start signal from the control circuit 12 to output an NI-in-FRM bit change signal to an insertion circuit 55. A FRM cell detector 54 judges whether or not the cell received by the receiver circuit 13a is a FRM cell and, when the cell is the FRM cell, outputs a FRM cell detection signal to an insertion circuit 55. The insertion circuit 55 changes the NI-in-FRM bit in the cell received by the receiver circuit 13a to "1" and transfers the latter to an SW circuit 15. A FRM cell producing/insertion circuit 56 is responsive to the self healing execution start signal from the control circuit 12 to produce a FRM cell having the NI bit set to "1" and outputs it to an insertion circuit 57. The insertion circuit 57 transfers this FRM cell to the SW circuit 15.

The FRM cell whose content is changed by the NI-in-FRM bit change circuit 53 and the insertion circuit 55 and the FRM cell newly inserted by the FRM cell producing/insertion circuit 56 and the insertion circuit 57 are aliased in their destination terminals and output therefrom as BRM cells.

A NI-in-BRM bit change circuit 58 is responsive to the self healing execution start signal from the control circuit 12 to output a NI-in-BRM bit change signal to an insertion circuit 60. A BRM cell detection circuit 59 judges whether or not the cell received by the receiver circuit 16b is a BRM cell and, when it is the BRM cell, outputs a BRM cell detection signal to the insertion circuit 60. The insertion circuit 60 changes the NI-in-BRM bit in the cells received by the receiver circuit 16b to "1" and transmits it to the transmitter circuit 13b. A BRM cell producing/insertion circuit 61 is responsive to the self healing execution start signal from the control circuit 12 to produce a new BRM cell whose NI bit is set to "11" and outputs it to an insertion circuit 62. The insertion circuit 62 transfers this BRM cell to the transmitter circuit 13b.

The above mentioned operations of the NI-in-FRM bit change circuit 53, the FRM cell producing/insertion circuit 56, the ER-in-BRAM field change circuit 58 and the BRM cell producing/insertion circuit 61 continue until the self healing start signal is canceled, that is, the switching of route due to the self healing is completed.

Through these operations, the NI bit becomes "1" and the source terminal can not increase the sending rate and, therefore, there is no case where the source terminal sending rate is increased from the value at the band assuring time.

Figure 8:
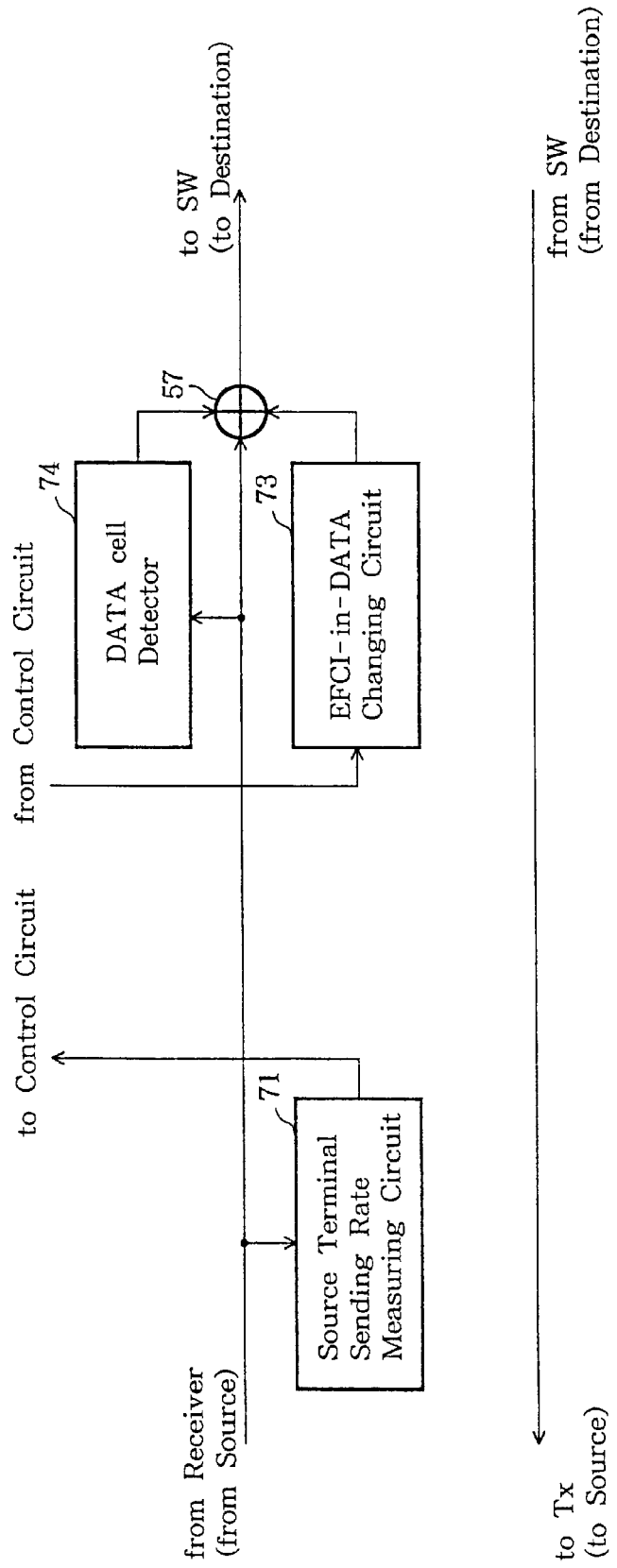
FIG. 8 is a block diagram showing a further construction of a prevention circuit of the embodiment shown in FIG. 5, for preventing the source terminal sending rate from being increased.

FIG. 8 is a block diagram showing another example of the construction of the prevention circuit 18 according to which the source terminal sending rate is prevented from being increased by utilizing EFCI-in-Data bit.

A source terminal sending rate measuring circuit 71 counts cells received by a receiver circuit 13a and output a result of the count to a control circuit 12 as a measured source terminal sending rate signal. An EFCI-in-Data bit change circuit 73 is responsive to the self healing execution start signal from the control circuit 12 to output an EFCI-in-Data bit change signal to an insertion circuit 75. A data cell detector 74 judges whether or not the cell received by the receiver circuit 13a is a data cell and, when the cell is the data cell, outputs a data cell detection signal to an insertion circuit 75. The insertion circuit 75 changes the EFCI-in-Data bit in the cell received by the receiver circuit 13a to "1" and transfers the latter to an SW circuit 15.

This processing for changing the EFCI bit to "1" continues until the self healing start signal is canceled, that is, the switching due to the self healing is completed.

The data cell whose EFCI bit is changed to "1" by the processing mentioned above is transferred to the destination terminal and the destination terminal produces a BRM cell whose NI bit and/or CI bit is set to "1" and transmits it to the source terminal. The source terminal receiving such BRM cell can not increase the sending rate, so that the source terminal sending rate does not increase beyond the value at the time when the band is assured.

Figure 9:
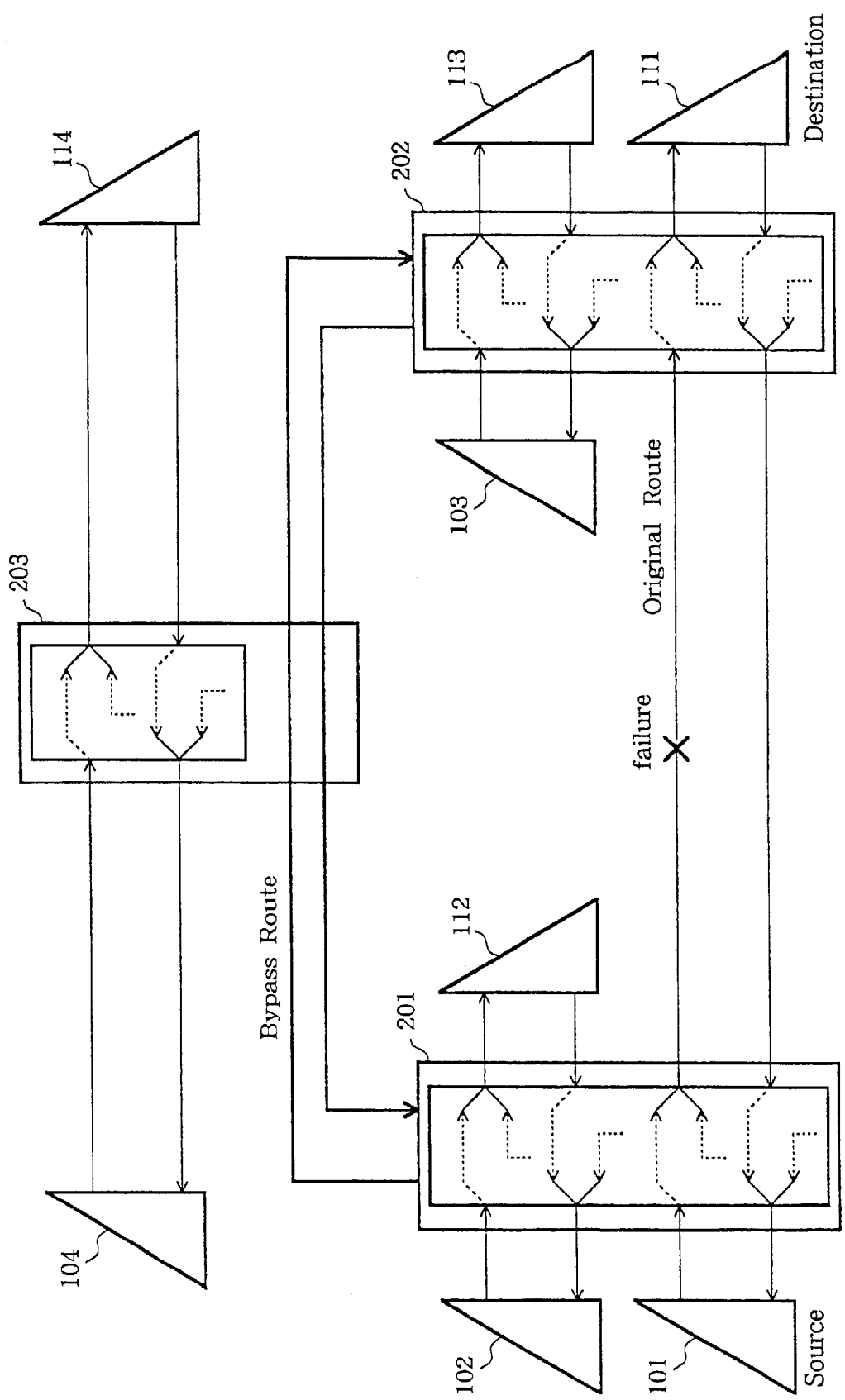
FIG. 9 is an illustration for explaining a path switching operation.

FIG. 9 is a diagram for explaining a path switching operation. In FIG. 9, it is assumed that a failure occurs in a path between ATM cell switch devices 201 and 202 during communications are held between a source terminal 101 and a destination terminal 111 through the ATM cell switch devices 201 and 202, between a source terminal 102 and a destination terminal 112 through the ATM cell switch device 201, between a source terminal 103 and a destination terminal 113 through the ATM cell switch device 202 and between a source terminal 104 and a destination terminal 114 through an ATM cell switch device 203. Further, it is assumed that a route including the ATM cell switch device 203 is to be used as a bypass route for the paths between the ATM cell switch devices 201 and 202.

In such case, when it is possible to assure a frequency band for switching the original path to the bypass route, the prevention circuits of the respective ATM cell switch devices 201 and 202 start to operate at a time when the failure occurs and perform a rewrite and insertion of FRM cell and BRM cell or perform a rewrite of EFCI-in-Data bit. Thus, an upper limit of the cell sending rate in the source terminal 101 is fixed. The prevention circuits of the ATM cell switch devices 201, 203 and 202 related to the bypass route are activated to fix upper limits of cell sending rate of the source terminals 102, 104 and 103, respectively.

Figure 10:
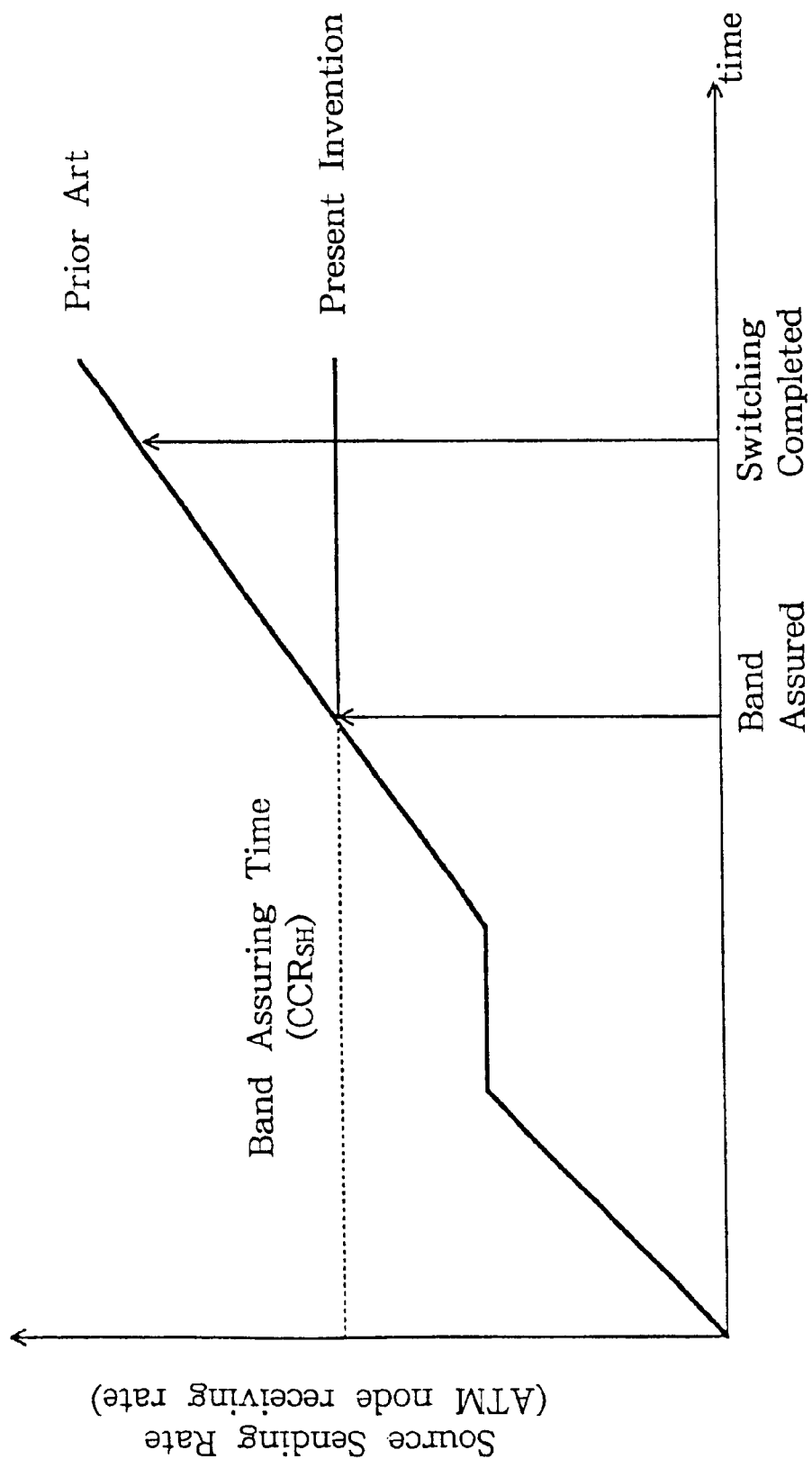
FIG. 10 shows a variation of sending rate from a time at which the frequency band is held to a time at which the switching is completed.

FIG. 10 shows an example of variation of the sending rate in a period from the time at which the band is assured to the time at which the switching is completed. As is clear from FIG. 10, although the source terminal sending rate is increased during the time period from the time at which the band is assured to the time at which the switching is completed in the conventional system, there is no such increase according to the present invention. Therefore, it becomes possible to perform the self healing of ABR without loss of cell.

What is claimed is:

1. A self healing method of an ABR communication service, for maintaining a cell transfer when a failure occurs in a path through which the cell transfer is performed from a source terminal to a destination terminal at a variable cell sending rate, by assuring a frequency band for the cell transfer in a bypass route different from said path and switching said path to a bypass route, said self healing method comprising the step of:

fixing upper limits of cell sending rate at source terminals in said path and said bypass route by setting contents of ER fields of BRM cells to be transferred to said respective source terminals to values of the sending rate of said respective source terminals at the time when the frequency band is assured in the bypass route, during the time period when the frequency band is assured in said bypass route to the time when the switching from said path to said bypass route is completed, by an ATM cell switch device which performs the path switching and an ATM cell switch device on said bypass route; and setting the sending rates of said respective source terminals according to the contents of said ER fields of said received BRM cells by said respective source terminals themselves.

2. The self healing method as claimed in claim 1, further comprising the steps of:

setting contents of ER fields of BRM cells to be transferred to said respective destination terminals to a value of the sending rate of said source terminal used at the time when the frequency band is assured in the bypass route, during the time period when the frequency band is assured in said bypass route to the time when the switching from said path to said bypass route is completed, by said ATM cell switch device which performs the path switching and said ATM cell switch device on the bypass route; and aliasing FRM cells as BRM cells by said destination terminals.

3. The self healing method as claimed in claim 2, further comprising the steps of:

producing BRM cells and FRM cells having ER fields set to the value of the sending rate of said source terminal used at the time when the frequency band in said bypass route is assured, during the time period when the frequency band is assured in said bypass route to the time when the switching from said path to said bypass route is completed, by said ATM cell switch device which performs the path switching and said ATM cell switch device on the bypass route; and sending the BRM cells and the FRM cells to said respective source and destination terminals corresponding thereto.

4. A self healing method of an ABR communication service, for maintaining a cell transfer when a failure occurs in a path through which the cell transfer is performed from a source terminal to a destination terminal at a variable cell sending rate, by assuring a frequency band for the cell transfer in a bypass route different from said path and switching said path to a bypass route, said self healing method comprising the step of:

fixing upper limits of cell sending rate at source terminals in said path and said bypass route by setting an NI bit of the BRM cells to be transferred to said respective source terminals to a predetermined value during the time period when the frequency band is assured in said bypass route to the time when the switching from said path to said bypass route is completed, by an ATM cell switch device which performs the path switching and an ATM cell switch device on the bypass route; and preventing the sending rates of said respective source terminals from being increased by said respective source terminals themselves, by using the value of the NI bit.

5. A self healing method as claimed in claim 4, further comprising the steps of:

setting an NI bit of the BRM to be transferred to said respective destination terminals to a predetermined value during the time period when the frequency band is assured in said bypass route to the time when the switching from said path to said bypass route is completed, by said ATM cell switch device which performs the path switching and said ATM cell switch device on the bypass route; and aliasing the FRM cell by said destination terminals as BRM cells.

6. A self healing method of an ABR communication service, for maintaining a cell transfer when a failure occurs in a path through which the cell transfer is performed from a source terminal to a destination terminal at a variable cell sending rate, by assuring a frequency band for the cell transfer in a bypass route different from said path and switching said path to a bypass route, said self healing method comprising the step of:

fixing upper limits of cell sending rate at source terminals in said path and said bypass route by setting EFCI bits of data cells from said source terminals to a predetermined value and transferring the EFCI bits to corresponding destination terminals by an ATM cell switch device which performs the path switching and an ATM cell switch device on the bypass route during the time period when the frequency band is assured in said bypass route to the time when the switching from said path to said bypass route is completed, by said ATM cell switch device which performs the path switching and said ATM cell switch device on the bypass route;

sending BRM cells having NI bit and/or CI bit set to the predetermined value to corresponding source terminals; and preventing the sending rates of said source terminals received with this BRM cell from being increased by said source terminals themselves.

7. An ATM cell switch device comprising:

receiving means for receiving a cell from a source terminal to which the cell is input through a transmission link;

switch means for routing the received cell on the basis of VPI and VCI of the received cell;

transmission means for sending the cell toward a destination terminal;

control means for managing a transmission rate of the source terminal, instructing a path switching to said switch means during an execution of self healing adjudging whether or not a frequency band is assured in a bypass route; and preventing means for sending a control information such that the sending rate of the source terminal is prevented from being increased during a time period from a time when said control means judges a band assured in said bypass route to a time when the path switching is completed by said switch means.

8. An ATM cell switch device as claimed in claim 7, wherein said preventing means further comprises an EFCI bit change circuit for changing an EFCI bit of the data cell transferred from the side of said source terminal toward the side of said destination terminal to "1".

9. An ATM cell switch device as claimed in claim 7, wherein said preventing means comprises:

source terminal transmission rate measuring circuit for counting cells received from said source terminal, a buffer circuit for holding a source terminal sending rate ($CCR_{SH}$) at a time when the frequency band is assured in said bypass route; and a first ER field change circuit for changing a content of the ER field of a BRM transferred from said destination terminal to said source terminal for circuit control to the $CCR_{SH}$.

10. An ATM cell switch device as claimed in claim 9, wherein said preventing means further comprises a second ER field change circuit for changing a content of the ER field of a FRM transferred from said source terminal to said destination terminal to the $CCR_{SH}$.

11. An ATM cell switch device as claimed in claim 10, wherein said preventing means further comprises a BRM cell producing/insertion circuit for newly producing a BRM cell having ER field set to the $CCR_{SH}$ and sending the BRM cell toward said source terminal and an FRM cell producing/insertion circuit for producing an FRM cell similarly and sending the FRM cell toward said destination terminal.

12. An ATM cell switch device as claimed in claim 7, wherein said preventing means further comprises a first NI bit change circuit for changing an NI bit of a BRM cell transferred from the side of said destination terminal toward the side of said source terminal to "1".

13. An ATM cell switch device as claimed in claim 12, wherein said preventing means further comprises a second NI bit change circuit for changing an NI bit of an FRM cell transferred from the side of said source terminal toward the side of said destination terminal to "1".

14. An ATM cell switch device as claimed in claim 13, wherein said preventing means further comprises a BRM cell producing/insertion circuit for newly producing a BRM cell having an NI bit set to "1" and sending the BRM cell toward said source terminal and an FRM cell producing/insertion circuit for producing an FRM cell similarly and sending the FRM cell toward the destination terminal.

* * * * *